US012585345B2

(12) United States Patent
Cuvillier

(10) Patent No.: US 12,585,345 B2
(45) Date of Patent: Mar. 24, 2026

(54) DETECTION DEVICE WITH THERMAL PROTECTION ARRANGEMENT

(71) Applicant: Faurecia Interieur Industrie, Nanterre (FR)

(72) Inventor: Christophe Cuvillier, Saint-Ouen-l'Aumône (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 18/827,539

(22) Filed: Sep. 6, 2024

(65) Prior Publication Data

US 2025/0077002 A1 Mar. 6, 2025

(30) Foreign Application Priority Data

Sep. 6, 2023 (FR) ...................................... 2309369

(51) Int. Cl.
G06F 3/044 (2006.01)
G06F 3/0354 (2013.01)
G06F 3/041 (2006.01)

(52) U.S. Cl.
CPC ...... G06F 3/03547 (2013.01); G06F 3/04164 (2019.05); G06F 3/044 (2013.01); G06F 2203/04105 (2013.01)

(58) Field of Classification Search
CPC .. G06F 3/03547; G06F 3/04164; G06F 3/044; G06F 2203/04105
See application file for complete search history.

(56) References Cited

U.S. PATENT DOCUMENTS

2014/0238131 A1* 8/2014 Yoshiuchi ........... B81C 1/00238
73/514.16
2017/0285864 A1 10/2017 Pedder et al.
2023/0127077 A1 4/2023 Low et al.

FOREIGN PATENT DOCUMENTS

WO 2009031590 A1 3/2009
WO 2015019329 A1 2/2015

OTHER PUBLICATIONS

French Search Report corresponding to application FR2309369, dated Feb. 22, 2024, 2 pages.

* cited by examiner

*Primary Examiner* — Afroza Chowdhury
(74) *Attorney, Agent, or Firm* — Reising Ethington P.C.

(57) ABSTRACT

A detection device that includes: a substrate having a first and a second side; a force sensor, attached to the first side of the substrate so as to cover a first area; and a conductive track extending on the first side from the force sensor. The detection device further includes: a layer of a first rigid adhesive, attached to the second side of the substrate, so as to cover a second area; the first and second areas being arranged opposite one another; and two through slots in the substrate, surrounding the second area, with the conductive track arranged between the two slots.

7 Claims, 3 Drawing Sheets

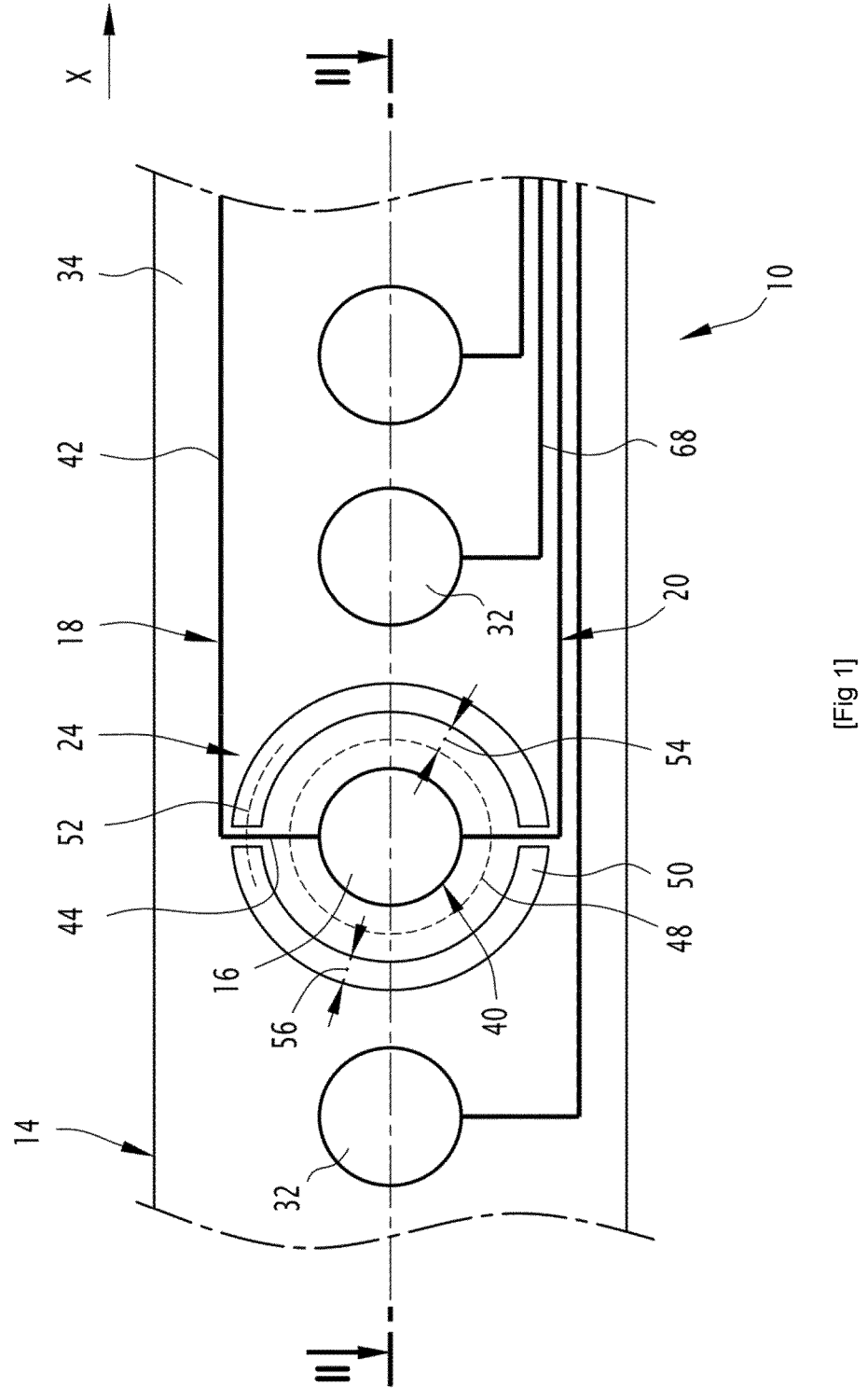
[Fig 1]

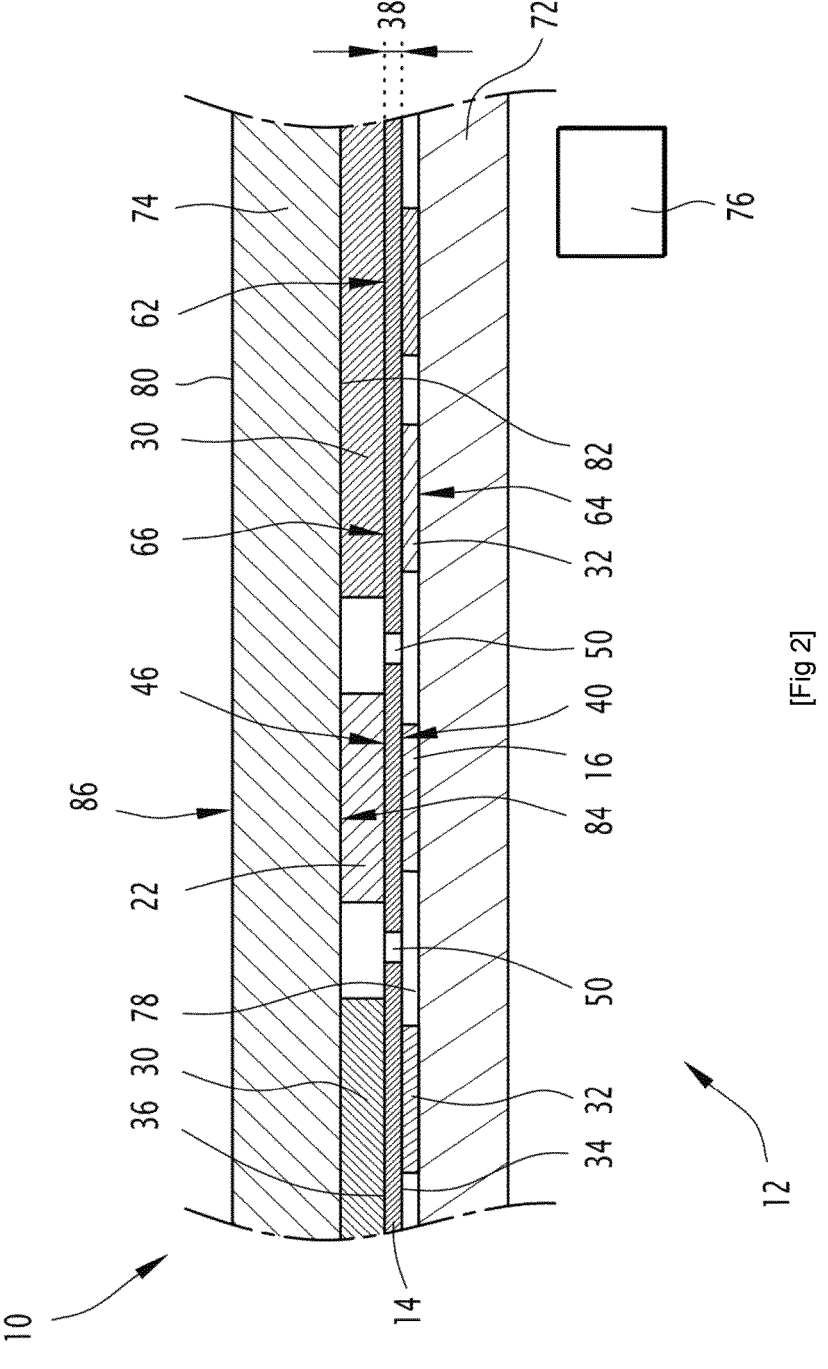
[Fig 2]

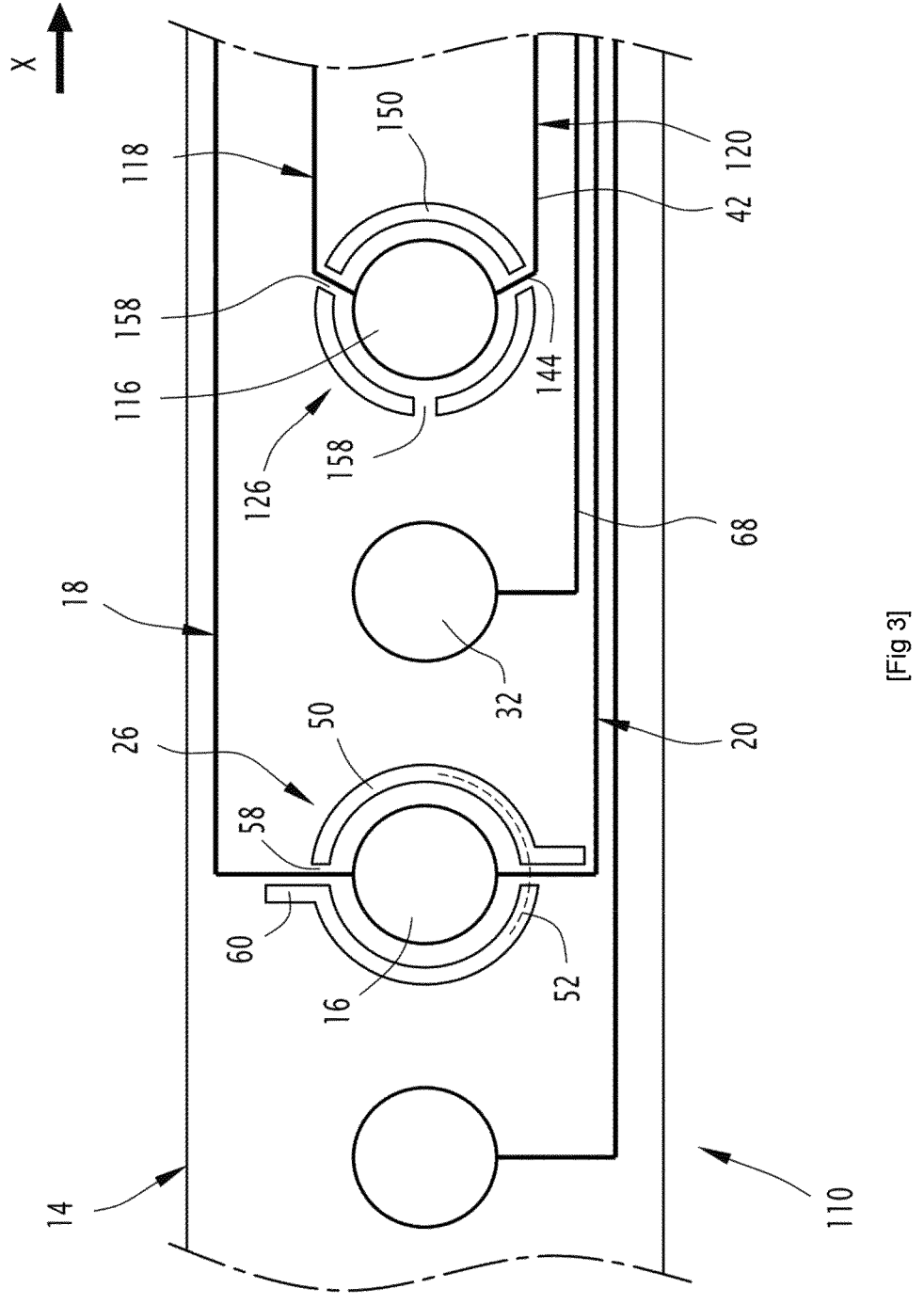
[Fig 3]

DETECTION DEVICE WITH THERMAL PROTECTION ARRANGEMENT

TECHNICAL FIELD

The present invention relates to a detection device of the type comprising: a substrate, comprising a first and a second opposite face; a force sensor, fixed to the first face of the substrate, covering a first area of the said first face; and at least one first conductive track. extending on said first face from the force sensor.

BACKGROUND

The invention is particularly applicable to devices used in the manufacture of touch screens or touch pads, as described for example in document U.S. Pat. No. 9,430,099.

The use of force sensors in such detection devices implies a strong mechanical link between the sensor and the surface of the touch screen, on which a user exerts finger pressure. It is therefore advantageous to connect said sensor and said surface using a rigid adhesive.

However, the different elements of the detection device, notably the substrate and the rigid adhesive, have different coefficients of thermal expansion. Therefore, during the heating associated with the device's use, it is likely to deform, which may lead to a break in the conductive track. The device is then rendered unusable.

It is therefore advantageous to provide thermal protection for the detection device, in order to prevent deformation of said device under the effect of heat, in the vicinity of areas comprising layers of rigid adhesive.

SUMMARY

To this end, the invention has as an object a detection device of the aforementioned type, further comprising: a layer of a first rigid adhesive, attached to the second face of the substrate, so as to cover a second area of said second face, the first and second areas being arranged opposite each other, a projection of the second area onto the first face containing the first area; and at least two through slots formed in the substrate, said at least two slots being arranged on a closed-shaped contour surrounding the second area, the first conductive track being arranged between two of said at least two slots.

According to other advantageous aspects of the invention, the detection device comprises one or more of the following features, taken individually or in all technically possible combinations:

the detection device further comprises a second conductive track, extending on the first side from the force sensor; and the substrate comprises at least two bridges, each of said bridges being arranged between two of the at least two slots, each of the first and second conductive tracks extending on one of said bridges;

a width of each of the at least two through slots is between 0.2 mm and 5 mm;

a distance between an inner edge of at least one of the at least two through slots and an edge of the second area is less than 5 mm;

the thickness of the substrate is less than 250 μm;

the detection device further comprises: a layer of a second soft adhesive, fixed to the second face of the substrate, so as to cover a third area of the said second face; and a capacitive electrode, fixed to one of the first and second faces, so as to cover a fourth area of the said first or second face, the third area containing the fourth area or containing a projection of the said fourth area onto the second face.

The invention also relates to a control panel comprising: a support; an external plate, comprising a contact surface and a bonding surface opposite each other; and a detection device as described above, the substrate being arranged on the support so that the force sensor is in contact with said support; and the bonding surface of the external plate is fixed to the layer of the first rigid adhesive.

Preferentially, the control panel also comprises an electronic control module, connected to the first conductor track.

BRIEF DESCRIPTION OF THE DRAWINGS

The invention will become clearer on reading the following description, given solely by way of non-limiting example, and made with reference to the drawings, wherein:

FIG. 1 is a detailed view of a detection device according to a first embodiment of the invention;

FIG. 2 is a detailed cross-sectional view of a control panel comprising the detection device of FIG. 1; and FIG. 3 is a detailed view of a detection device according to a second embodiment of the invention.

DETAILED DESCRIPTION

FIGS. 1 and 3 show detection devices 10, 110, respectively, according to a first and a second embodiment of the invention. Devices 10 and 110 are particularly intended for the realization of a control panel 12, schematically shown in FIG. 2.

In the following description, devices 10 and 110 will be described simultaneously, common elements being designated by the same reference numbers.

The detection devices 10 and 110 comprise: a substrate 14; a force sensor 16, 116; and at least one conductive track 18, 20, 118, and 120

The detection device 10, 110 further comprises: a layer 22 of a first adhesive; and a thermal protection arrangement 24, 26, 126

In the embodiments shown, the detection device 10, 110 further comprises: at least one layer 30 of a second adhesive; and at least one capacitive electrode 32.

The substrate 14 comprises a first 34 and a second 36 face, opposite and substantially parallel to each other. In the embodiments shown, the substrate has the form of a band extending in a main direction X The substrate 14 is formed of a thin film. Preferentially, the thickness 38 of the substrate 14 is less than 250 μm. More preferentially, the thickness of substrate 14 is between 50 μm and 250 μm.

The substrate 14 is formed of a plastic material, preferentially a thermoplastic material. The material of the substrate 14 is for example chosen from polyethylene terephthalate (PET), polyethylene naphthalate (PEN), polycarbonate (PC), polymethyl methacrylate (PMMA), and their blends The force sensor 16, 116 is fixed to the first face 34 of the substrate, so as to cover a first area (or zone) 40 of said first face.

In the embodiments shown, the force sensor 16, 116 is in the form of a pellet of a first functional material, deposited on the first face 34. The first functional material is, for example, a piezoelectric material. Alternatively, the force sensor is, for example, resistive, capacitive, or inductive technology.

In the embodiments shown, the sensor pellet 16, 116 has a round shape. Alternatively, the pellet has for example an oval or polygonal shape The force sensor 16, 116 is for example realized by printing one or more functional inks on the first face 34 of the substrate.

According to an embodiment, such as that shown in FIG. 3, the detection device 10, 110 comprises several force sensors 16, 116 arranged on the first face 34 of the substrate 14. Said several force sensors 16, 116 are preferably distributed along the main direction X.

The at least one conductive track 18, 20, 118, 120 extends on the first face 34 of the substrate 14. The at least one conductive track 18, 20, 118, 120 is in the form of a strip extended from the force sensor 16, 116.

The at least one conductive track 18, 20, 118, 120 is able to conduct an electric current from the force sensor 16, 116. In the embodiments shown, the detection device 10, 110 comprises a first 18, 118 and a second 20, 120 conductive tracks associated with each force sensor 16, 116.

In the embodiments shown, each conductive track 18, 20, 118, 120 comprises: a main portion 42 extending parallel to direction X; and a bonding portion 44, 144 connecting the said main portion to the force sensor 16, 116. Preferably, the connecting portion 44, 144 is substantially straight and forms a non-zero angle with the X direction.

The first adhesive layer 22 is attached to the second side 36 of the substrate, so as to cover a second area (zone) 46 of said second side.

The first 40 and second 46 zones are arranged opposite each other. As visible in FIG. 1, a projection 48 of the second zone 46 onto the first face contains the first zone 40. In other words, the first zone 40, in contact with the force sensor 16, 116, is included in said projection 48 of the second zone 46.

Preferably, the second zone 46 is similar in shape to the first zone 40. In the embodiments shown, the second zone 46 has the shape of a disk with a diameter greater than that of the first zone 40.

The first adhesive forming layer 22 is a rigid adhesive. The term "rigid adhesive" refers in particular to an adhesive with a Young's modulus greater than 500 MPa.

Preferably, layer 22 of the first adhesive has a thickness of between 15 μm and 200 μm, more preferentially of the order of 50 μm.

In the embodiments shown, the detection device 10, 110 comprises a thermal protection arrangement 24, 26, 126 associated with the or each force sensor 16, 116.

The thermal protection arrangement 24, 26, 126 comprises through slots 50, 150 in the substrate 14. By "through slots," it is meant that the slots 50, 150 connect the first 34 and second 36 faces of the substrate.

The slots 50, 150 of an arrangement 24, 26, 126 are arranged on a closed contour 52, surrounding the first zone 40 in contact with the corresponding force sensor 16, 116. More precisely, the contour 52 surrounds the second zone 46 in contact with the layer 22 of the first adhesive, associated with said force sensor 16, 116.

In the embodiments shown, the contour 52 has the shape of a circle with a diameter greater than that of the second zone 46.

Preferably, a distance 54 between an inner edge of a slot 50, 150 and an edge of the corresponding second zone 46 is less than 5 mm.

Preferably, the width 56 of each slot 50, 150 is between 0.2 mm and 5 mm.

The arrangement 24, 26, 126 comprises at least two slots 50, 150. More precisely, the substrate 14 comprises at least two bridges 58, 158, each of the said bridges being arranged on the contour 52, between two of the at least two holes 50, 150. Bridges 58, 158 mechanically connect the second zone 40 to the rest of the substrate 14.

According to one embodiment, the arrangement 24, 26 comprises two holes 50 and two bridges 58, alternating on the contour 52. According to another embodiment, the arrangement 126 comprises a number of slots 150 and bridges 158 greater than two, for example equal to three or four.

According to one embodiment, visible in FIG. 3, the arrangement 26 further comprises at least two substantially rectilinear notches 60, each notch extending one of the slots 50 in a direction opposite to the second zone 46.

Each of the conductor tracks 18, 20, 118, 120, associated with a force sensor 16, 116, extends between two slots 50, 150 of the arrangement 24, 26, 126 corresponding to said force sensor.

More specifically, in the embodiments shown, the connecting portion 44, 144 of each conductive track 18, 20, 118, 120 extends over a bridge 58, 158 of the corresponding arrangement 24, 26, 126.

In the arrangement 26 shown in FIG. 3, each connecting portion 44 also extends along a notch 60.

The second adhesive layer 30 is attached to the second side 36 of the substrate 14. More precisely, the layer 30 covers a third zone 62 of the second face 36.

The second adhesive forming layer 30 is a flexible adhesive. The term "flexible adhesive" refers in particular to an adhesive with a Young's modulus of less than 500 MPa. The second adhesive is, for example, an ASP (pressure-sensitive adhesive) type.

The second adhesive layer 30 has a thickness similar to that of the first adhesive layer 22.

The capacitive electrode 32 is attached to one of the first 34 and second 36 faces, so as to cover a fourth area 64 of said first or second face.

In the embodiments shown, the capacitive electrode 32 is attached to the first face 34. The fourth zone 64 is located opposite the third zone 62, so that said third zone contains a projection 66 of said fourth zone 64 on the second face 36.

In an embodiment not shown, the capacitive electrode is attached to the second side of the substrate and the third zone contains the fourth zone. In such an embodiment, the second adhesive layer 30 covers the capacitive electrode 32.

In the embodiments shown, the capacitive electrode 32 is in the form of a pellet of a second functional material, deposited on the substrate 14. The second functional material is, for example, a conductive ink. The said ink can be transparent or opaque. These include silver, carbon and Pedot inks.

In the embodiments shown, the pellet forming the capacitive electrode 32 has a round shape. Alternatively, the pellet has for example an oval or polygonal shape.

Preferably, the detection device 10, 110 comprises several capacitive electrodes 32 arranged on the substrate 14. Said several capacitive electrodes 32 are preferably distributed along the main direction X.

According to one embodiment, a single layer 30 of second adhesive covers several capacitive electrodes 32 or the projections of several of said electrodes on the second side 36. According to a particular embodiment of the invention, a layer 30 of second adhesive continuously covers the second side 36 of the substrate 14, with the exception of the inside of the contour(s) 52.

In the embodiments shown, the detection device 10, 110 further comprises at least one third conductive track 68, in the form of a strip extended from the capacitive electrode 32. Said third conductive track 68 is arranged on the same face as said capacitive electrode. Preferably, the detection device 10, 110 comprises at least a third conductive track 68 associated with each capacitive electrode 32.

FIG. 2 shows the aforementioned control panel 12. Panel 12 comprises the detection device 10 as described above and shown in FIG. 1. In a variant not shown, panel 12 comprises the detection device 110 shown in FIG. 3.

The control panel 12 further comprises: a support 72; an outer plate 74; and an electronic control module 76.

The support 72 has an upper surface 78 on which the detection device 10 is arranged. The first face 34 of said detection device 10 faces the upper surface 78 of the support 72. More precisely, the force sensor(s) 16, 116 are in contact with said support.

In the embodiment shown, the top surface 78 is substantially flat.

The outer plate 74 comprises a contact surface 80 and a bonding surface 82, opposite each other. The bonding surface 82 faces the detection device 10 and is attached to the layers 22, 30 of first and second adhesives.

More precisely, the or each layer 22 of the first adhesive is attached to a fifth zone 84 of the bonding surface 82. Said fifth zone 84 corresponds to a projection 86 on the contact surface 80

Preferably, the outer plate 74 is made of a plastic material comprising compounds such as polypropylene, polycarbonate, acrylonitrile butadiene styrene or mixtures thereof.

The electronic control module 76, shown schematically in FIG. 2, is connected to the ends of the conductive tracks 18, 20, 118, 120, 68, opposite the corresponding force sensors 16, 116 or capacitive electrodes 32.

A method for orienting the ventilation device 12 will now be described.

The outer plate 74 is used, for example, as a touchpad. More precisely, pressure from a user's finger on the contact surface 80 leads to the generation of an electrical signal by a force sensor 16, 116 or by a capacitive electrode 32. The signal is transmitted to the electronic module 76 via the corresponding conductor track(s) 18, 20, 118, 120, 68.

More specifically, due to the rigid nature of the first adhesive, the or each layer 22 of said first adhesive ensures a strong mechanical bond between the outer plate 74 and the sensor 16, 116 corresponding to said layer. Pressure exerted by the user's finger on the projection 86 of the fifth zone 84 is therefore effectively transmitted to the corresponding force sensor 16, 116.

Due to the flexible nature of the second adhesive, the mechanical bond formed by the layer 30, between the outer plate 74 and the capacitive electrode(s) 32, is less strong. Such a link is nonetheless sufficient for a user's finger pressing against a capacitive electrode 32 to generate the expected signal.

In particular, the mechanical link is associated with the absence of an air gap between the capacitive electrode and the outer plate 74. Indeed, the presence of such an air gap would lead to a loss of sensitivity of the capacitive electrode.

The substrate 14, the layer(s) 22 of first adhesive and the layer(s) 30 of second adhesive have different coefficients of thermal expansion. In particular, the first and second adhesives have different coefficients of thermal expansion.

During operation of control panel 12, heating leads to expansion of layers 22 and 30. Such expansions lead to shear forces on the surface of substrate 14.

In the vicinity of the second zone(s) 46 in contact with the layer(s) 22 of first adhesive, the presence of slots 50, 150 enables local elastic deformation of the substrate, preventing shear fracture of the first and second tracks 18, 20, 118, 120. In addition, the presence of said slots reduces the temperature rise of the device 10, 110 in the vicinity of said second zones 46.

The use of an arrangement 24, 26, 126 of thermal protection comprising slots 50, 150 enables the substrate 14 and the outer plate 74 to be connected by several layers 22, 30 of adhesive of different natures, each offering a suitable mechanical connection with the sensor 16, 116 or the corresponding capacitive electrode 32. The integrity of the device 10, 110 is preserved as it warms up, despite the different coefficients of thermal expansion of the adhesives.

The invention claimed is:

1. A detection device comprising:
   a substrate, comprising first and second opposing faces, and at least two bridges;
   a force sensor, attached to the first face of the substrate, so as to cover a first area of said first face;
   at least one first conductive track, extending on said first face from the force sensor; and
   a second conductive track, extending on the first face from the force sensor, each of the first and second conductive tracks extending on one of the bridges;
wherein the detection device further comprises:
   a layer of a first rigid adhesive, attached to the second face of the substrate, so as to cover a second area of said second face;
   the first and second areas being arranged opposite each other, a projection of the second area onto the first face containing the first area; and
   at least two through slots in the substrate, said at least two slots being arranged on a closed contour surrounding the second area, the first conductive track being arranged between two of said at least two slots, and each of the bridges being arranged between two of said at least two slots.

2. The detection device according to claim 1, wherein a width of each of the at least two through slots is between 0.2 mm and 5 mm.

3. The detection device according to claim 1, wherein a distance between an inner edge of at least one of the at least two through slots and an edge of the second area is less than 5 mm.

4. The detection device according to claim 1, wherein a thickness of the substrate is less than 250 μm.

5. The detection device according to claim 1, further comprising: a layer of a second flexible adhesive, attached to the second face of the substrate, so as to cover a third area of said second face; and a capacitive electrode, attached to one of the first and second faces, so as to cover a fourth area of said first or second face, the third area containing the fourth area or containing a projection of said fourth area onto the second face.

6. A control panel, comprising: a support; an outer plate comprising a contact surface and a bonding surface opposite each other; and the detection device according to claim 1, the substrate being arranged on the support so that the force sensor is in contact with said support; and the bonding surface of the outer plate is attached to the layer of first rigid adhesive.

7. The control panel according to claim 6, further comprising an electronic control module connected to the first conductive track.

* * * * *